(12) United States Patent
Gore et al.

(10) Patent No.: US 7,198,834 B2
(45) Date of Patent: Apr. 3, 2007

(54) IMAGING MEDIA INCLUDING INTERFERENCE LAYER FOR GENERATING HUMAN-READABLE MARKING ON OPTICAL MEDIA

(75) Inventors: Makarand P. Gore, Corvallis, OR (US); James Z. Guo, Corvallis, OR (US); Anurag Gupta, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/086,875

(22) Filed: Mar. 22, 2005

(65) Prior Publication Data

US 2006/0216456 A1   Sep. 28, 2006

(51) Int. Cl.
*B41M 5/30* (2006.01)
(52) U.S. Cl. .................. 428/64.4; 503/200; 503/226
(58) Field of Classification Search ......... 503/200–226
See application file for complete search history.

(56) References Cited

U.S. PATENT DOCUMENTS

| | | | |
|---|---|---|---|
| 3,658,543 A | 4/1972 | Gerlach, Jr. et al. | |
| 3,874,240 A | 4/1975 | Rembaum | |
| 4,101,690 A | 7/1978 | Miyamoto et al. | |
| 4,138,357 A | 2/1979 | Igarashi | |
| 4,142,151 A | 2/1979 | Hansen | |
| 4,170,190 A | 10/1979 | Warner | |
| 4,412,231 A | 10/1983 | Namba et al. | |
| 4,443,302 A | 4/1984 | Gendler et al. | |
| 4,478,687 A | 10/1984 | Gendler et al. | |
| 4,552,980 A | 11/1985 | Gabrielsen | |
| 4,563,415 A | 1/1986 | Brown et al. | |
| 4,598,035 A | 7/1986 | Usami et al. | |
| 4,601,588 A | 7/1986 | Takahara et al. | |
| 4,647,525 A | 3/1987 | Miller | |
| 4,670,374 A | 6/1987 | Bellus et al. | |
| 4,682,857 A | 7/1987 | Tan | |
| 4,782,010 A | 11/1988 | Mader et al. | |
| 4,835,475 A | 5/1989 | Hanakura et al. | |
| 4,835,476 A | 5/1989 | Kurosawa | |
| 4,838,664 A | 6/1989 | Gerlach, Jr. et al. | |
| 4,842,980 A | 6/1989 | Gottschalk et al. | |
| 4,853,362 A | 8/1989 | Satake et al. | |
| 4,889,932 A | 12/1989 | Miller | |
| 4,891,250 A | 1/1990 | Weibe et al. | |
| 4,917,503 A | 4/1990 | Bhattacharjee | |
| 4,983,498 A | 1/1991 | Rode et al. | |

(Continued)

FOREIGN PATENT DOCUMENTS

DE    33 19738 A1    12/1983

(Continued)

OTHER PUBLICATIONS

H. Bouas-Laurent et al., "Organic Photochromism" (IUPAC Technical Report), Pure Appl. Chem., vol. 73, No. 4, pp. 638-665, 2001, pp. 639-665.

(Continued)

*Primary Examiner*—Bruce H. Hess (57) ABSTRACT

An optical recording medium, comprises a substrate, and an imaging medium disposed on the substrate, the imaging medium comprising: a marking layer including a thermochromic compound and an interference layer tuned to absorb light having a predetermined wavelength.

20 Claims, 4 Drawing Sheets

U.S. PATENT DOCUMENTS

| | | | |
|---|---|---|---|
| 4,994,337 A | 2/1991 | Masaki et al. |
| 5,043,249 A | 8/1991 | Rode et al. |
| 5,066,564 A | 11/1991 | Zertani et al. |
| 5,153,106 A | 10/1992 | Liu |
| 5,196,250 A | 3/1993 | Abe et al. |
| 5,234,797 A | 8/1993 | Satake et al. |
| 5,294,374 A | 3/1994 | Martinez et al. |
| 5,385,807 A | 1/1995 | Okamoto et al. |
| 5,387,682 A | 2/1995 | Bonham et al. |
| 5,409,797 A | 4/1995 | Hosoi et al. |
| 5,428,161 A | 6/1995 | Miller et al. |
| 5,434,119 A | 7/1995 | Satake et al. |
| 5,443,908 A | 8/1995 | Matsushita et al. |
| 5,460,646 A | 10/1995 | Lazzouni et al. |
| 5,466,557 A | 11/1995 | Haley et al. |
| 5,484,685 A | 1/1996 | Tai et al. |
| 5,494,772 A | 2/1996 | Hosoi et al. |
| 5,543,382 A | 8/1996 | Watanabe et al. |
| 5,571,388 A | 11/1996 | Patonay et al. |
| 5,637,709 A | 6/1997 | Melzig |
| 5,673,028 A | 9/1997 | Levy |
| 5,679,661 A | 10/1997 | Willey |
| 5,684,069 A | 11/1997 | Auslander |
| 5,693,693 A | 12/1997 | Auslander et al. |
| 5,741,836 A | 4/1998 | Krenceski et al. |
| 5,911,816 A | 6/1999 | Gore |
| 5,915,858 A | 6/1999 | Wen |
| 5,958,087 A | 9/1999 | Liao et al. |
| 5,976,232 A | 11/1999 | Gore |
| 5,989,772 A | 11/1999 | Tutt et al. |
| 6,015,896 A | 1/2000 | Mistry et al. |
| 6,017,981 A | 1/2000 | Hugo |
| 6,022,648 A | 2/2000 | Jacobson et al. |
| 6,024,786 A | 2/2000 | Gore |
| 6,025,486 A | 2/2000 | Mistry et al. |
| 6,096,794 A | 8/2000 | Cunningham et al. |
| 6,132,931 A | 10/2000 | Kawamura et al. |
| 6,137,669 A | 10/2000 | Chiang et al. |
| 6,165,683 A | 12/2000 | Chapman et al. |
| 6,203,069 B1 | 3/2001 | Outwater et al. |
| 6,245,137 B1 | 6/2001 | Gore |
| 6,251,571 B1 | 6/2001 | Dessauer et al. |
| 6,306,478 B1 | 10/2001 | Chen et al. |
| 6,309,797 B1 | 10/2001 | Grinevich et al. |
| 6,406,138 B1 | 6/2002 | Gore |
| 6,407,560 B1 | 6/2002 | Walraven et al. |
| 6,410,628 B1 | 6/2002 | Hall-Goulle et al. |
| 6,417,248 B1 | 7/2002 | Gore |
| 6,423,467 B1 | 7/2002 | Kawauchi et al. |
| 6,428,148 B1 | 8/2002 | Gore |
| 6,433,035 B1 | 8/2002 | Grinevich et al. |
| 6,486,473 B2 | 11/2002 | Salapow et al. |
| 6,488,405 B1 | 12/2002 | Eppes et al. |
| 6,500,563 B1 | 12/2002 | Yamada et al. |
| 6,531,261 B1 | 3/2003 | Usami et al. |
| 6,536,672 B1 | 3/2003 | Outwater |
| 6,541,092 B2 | 4/2003 | Shibata et al. |
| 6,549,025 B1 | 4/2003 | Tubera et al. |
| 6,585,367 B2 | 7/2003 | Gore |
| 6,670,037 B1 | 12/2003 | Okura et al. |
| 6,689,476 B1 | 2/2004 | Bosies et al. |
| 6,709,800 B2 | 3/2004 | Fujita et al. |
| 6,720,043 B1 | 4/2004 | Sismondi et al. |
| 6,720,124 B2 | 4/2004 | Takashima et al. |
| 6,740,465 B2 | 5/2004 | Liang et al. |
| 6,749,999 B2 | 6/2004 | Yabuki et al. |
| 6,789,421 B2 | 9/2004 | Gore et al. |
| 6,798,976 B2 | 9/2004 | Tsumagari et al. |
| 6,805,929 B2 | 10/2004 | Koga et al. |
| 6,830,872 B2 | 12/2004 | Mizutani et al. |
| 6,835,725 B2 | 12/2004 | Berneth et al. |
| 6,838,222 B2 | 1/2005 | Aoshima et al. |
| 6,844,146 B2 | 1/2005 | Hosokawa et al. |
| 6,849,315 B2 * | 2/2005 | Lehmann et al. ......... 428/64.1 |
| 6,855,443 B2 | 2/2005 | Gore |
| 6,890,614 B2 | 5/2005 | Gore et al. |
| 6,894,107 B2 | 5/2005 | Gore |
| 6,946,362 B2 | 9/2005 | Gore et al. |
| 6,958,181 B1 | 10/2005 | Gore |
| 6,974,661 B2 | 12/2005 | Gore et al. |
| 6,983,475 B2 | 1/2006 | Anderson et al. |
| 2002/0045548 A1 | 4/2002 | Saito |
| 2002/0089580 A1 | 7/2002 | Suzuki et al. |
| 2002/0091241 A1 | 7/2002 | Wang et al. |
| 2002/0140791 A1 | 10/2002 | Gore |
| 2002/0156156 A1 | 10/2002 | Gore |
| 2002/0160295 A1 | 10/2002 | Aoshima et al. |
| 2002/0183203 A1 | 12/2002 | Hoefs et al. |
| 2003/0003399 A1 | 1/2003 | Muller et al. |
| 2003/0008239 A1 | 1/2003 | Fujimaki et al. |
| 2003/0052036 A1 | 3/2003 | Gore et al. |
| 2003/0108708 A1 | 6/2003 | Anderson et al. |
| 2003/0134161 A1 | 7/2003 | Gore et al. |
| 2003/0134162 A1 | 7/2003 | Gore et al. |
| 2004/0076861 A1 | 4/2004 | Mann et al. |
| 2004/0146812 A1 | 7/2004 | Gore et al. |
| 2004/0147399 A1 | 7/2004 | Gore |
| 2004/0202904 A1 | 10/2004 | Gore et al. |
| 2004/0214056 A1 | 10/2004 | Gore |
| 2005/0037285 A1 | 2/2005 | Van Brocklin et al. |
| 2005/0053748 A1 | 3/2005 | Gore et al. |
| 2005/0053860 A1 | 3/2005 | Gore |
| 2005/0053863 A1 | 3/2005 | Gore |
| 2005/0058885 A1 | 3/2005 | Brocklin et al. |
| 2005/0075248 A1 | 4/2005 | Gore et al. |
| 2005/0089782 A1 | 4/2005 | Kasperchik et al. |
| 2005/0095470 A1 | 5/2005 | Harding et al. |
| 2005/0100817 A1 | 5/2005 | Kasperchik et al. |
| 2005/0112333 A1 | 5/2005 | Gore et al. |
| 2005/0128273 A1 | 6/2005 | Gore |
| 2005/0195370 A1 | 9/2005 | Gore et al. |
| 2005/0214969 A1 | 9/2005 | Gore et al. |
| 2005/0227034 A1 | 10/2005 | Gore |
| 2005/0232973 A1 | 10/2005 | Gore |
| 2005/0232974 A1 | 10/2005 | Gore |
| 2005/0244741 A1 | 11/2005 | Kasperchik et al. |
| 2005/0254551 A1 | 11/2005 | McClure et al. |
| 2005/0269234 A1 | 12/2005 | Gore et al. |
| 2005/0274274 A1 | 12/2005 | Gore et al. |
| 2005/0281965 A1 | 12/2005 | Gore |
| 2006/0008507 A1 | 1/2006 | Gore |

FOREIGN PATENT DOCUMENTS

| | | |
|---|---|---|
| EP | 0 378 336 A1 | 1/1990 |
| EP | 0 566 353 A1 | 10/1993 |
| EP | 0 786 768 A2 | 7/1997 |
| EP | 0 716 135 | 9/1999 |
| EP | 1 006 116 A1 | 6/2000 |
| EP | 1 063 231 A1 | 12/2000 |
| EP | 1 124 228 A1 | 8/2001 |
| EP | 1 249 343 A2 | 10/2002 |
| EP | 1 371 697 A2 | 12/2003 |
| EP | 1 371 697 A3 | 12/2003 |
| GB | 2 216 676 A | 10/1989 |
| JP | 1986-123158 | 4/1986 |
| JP | 1986-322554 | 10/1986 |
| JP | 63-027587 A | 2/1988 |
| JP | 63-033477 | 2/1988 |
| JP | 63244652 A | 10/1988 |
| JP | 01157501 A | 6/1989 |
| JP | 02-004583 | 1/1990 |
| JP | 02002060 A | 1/1990 |
| JP | 03-126581 | 5/1991 |

| | | |
|---|---|---|
| JP | 04342193 A | 11/1992 |
| JP | 05107212 A | 4/1993 |
| JP | 05-258346 | 10/1993 |
| JP | 05-278329 | 10/1993 |
| JP | 6-123993 | 5/1994 |
| JP | 1994-257362 | 5/1994 |
| JP | 07258561 A2 | 10/1995 |
| JP | 09-240145 | 9/1997 |
| JP | 2002-122729 | 4/2002 |
| JP | 2002203321 A | 7/2002 |
| JP | 2002-328446 | 11/2002 |
| JP | 2003-162022 | 6/2003 |
| JP | 2003-549257 | 6/2003 |
| JP | 2004005847 A | 1/2004 |
| JP | 2004227752 A | 8/2004 |
| WO | WO 99/24527 | 5/1999 |
| WO | WO 02/078967 A1 | 10/2002 |
| WO | WO 03/032299 A2 | 4/2003 |

OTHER PUBLICATIONS

Delaey, F. et al., "A comparative study of the photosenitizing characteristics of some cyanine dyes"; Photochem. Photobiol. B:Biol. 55 (2000) pp. 27-36.

* cited by examiner

IMAGING MEDIA INCLUDING INTERFERENCE LAYER FOR GENERATING HUMAN-READABLE MARKING ON OPTICAL MEDIA

BACKGROUND

Digital data are recorded on CDs, DVDs, and other optical media by using a laser to create pits in the surface of the medium. The data can then be read by a laser moving across them and detecting variations in the reflectivity of the surface. While this method is effective for creating machine-readable features on the optical medium, those features are not legible to the human eye.

Materials that produce color change upon stimulation with energy such as light or heat may have possible applications in imaging. For example, such materials may be found in thermal printing papers and instant imaging films. Some thermochromic coatings comprise mixtures of two or more components. The components mix and react upon application of energy, resulting in a color change. To achieve the necessary mixing, the components must react in a liquid phase. Because the coating is provided as a solid, relatively large amounts of energy are required in order to achieve the requisite melting. For example, a relatively powerful carbon dioxide laser with an energy density of 3 $J/cm^2$ applied for longer than 100 μs may be needed to produce a mark in some films.

If the energy is being provided in the form of light, the requisite energy must not only be present, but it must be effectively absorbed and transformed into thermal energy. Depending on the application, it may be difficult to achieve the necessary level of energy absorption. Therefore, there is a need for laser-activated marking coatings that absorb light energy efficiently and are robust and easily assembled.

BRIEF SUMMARY

The problems noted above are solved in large part by providing an energy absorbing layer in the form of a bandpass or interference filter layer adjacent to a thermochromic marking layer.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections.

As used herein, the term "thermochromic" describes a chemical, material, or device that changes from one color to another, or from a colorless state to a colored state, as discerned by the human eye, when it undergoes a change in temperature. Because the temperature change may be brought about by absorption of incident light, some of the thermochromic materials or processes described herein may also be considered photochromic.

The term "leuco dye" is used herein to refer to a color-forming substance that is colorless or colored in a non-activated state and produces or changes color in an activated state. As used herein, the term "activator" is a substance that reacts with the dye and causes the dye to alter its chemical structure and change or acquire color.

The terms "bandpass filter" and "interference filter" are used interchangeably herein to refer to one or more layers that are constructed so as to selectively absorb light having a predetermined wavelength and to reflect light having other wavelengths.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad applications, and the discussion of any embodiment is meant only to be exemplary of that embodiment, and not intended to intimate that the scope of the disclosure, including the claims, is limited to that embodiment.

Figure 1:
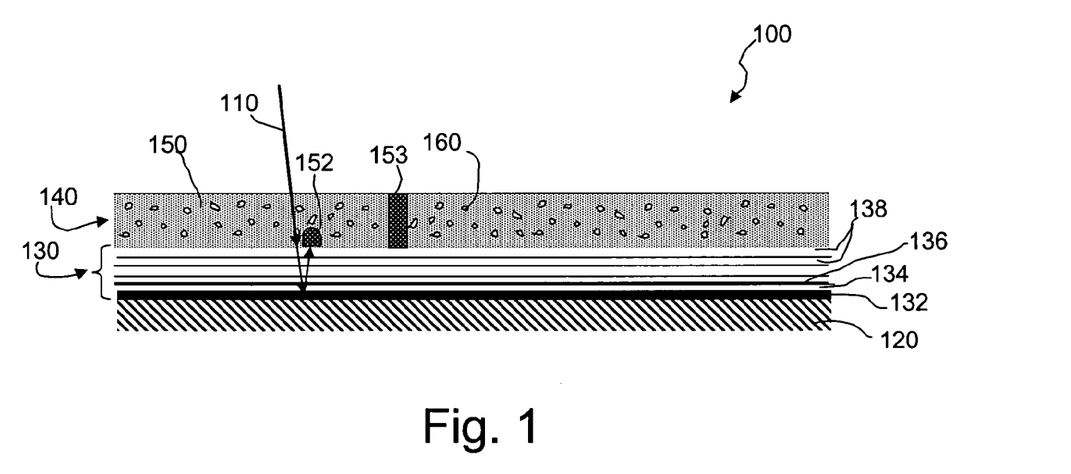
FIG. 1 is a schematic cross-section showing an imaging medium according to embodiments of the present invention on a substrate.

Referring initially to the embodiments illustrated in the drawing, there is shown an imaging medium 100, a substrate 120 to which imaging medium 100 is affixed, and energy 110. Imaging medium 100 comprises at least an interference layer 130 and a thermochromic marking layer 140. Substrate 120 may be any substrate upon which it is desirable to make a mark, such as, by way of example only, paper (e.g., labels, tickets, receipts, or stationary), overhead transparencies, or the labeling surface of a medium such as a CD-R/RW/ROM or DVD±R/RW/ROM. Interference layer 130 and thermochromic marking layer 140 may be applied to the substrate via any acceptable method, such as, by way of example only, rolling, spraying, or screen printing.

In certain embodiments, interference layer 130 comprises an optional interface layer (not shown), a metal substrate layer 132, at least one inner dielectric layer 134, a thin metal layer 136, and one or more optional outer dielectric layers.

In some embodiments, metal substrate layer 132 comprises a relatively thick, i.e., greater than 1 μm, layer of a reflective metal such as aluminum, germanium, niobium, or the like. Inner dielectric layer 134 may comprise one or more thin films of a suitable dielectric material such as $SiO_2$ (silicon dioxide) and $TiO_2$ (titanium dioxide). It may have a thickness of approximately 0.05 to 0.5 μm, more particularly from about 0.2 to about 0.34 μm. Unlike metal substrate layer 132, thin metal layer 136 may be constructed such that it partially transmits and partially reflects the desired wavelength. Layer 136 may also partially absorb the desired wavelength. For example, layer 136 may comprise a relatively thin, i.e., less than 0.5 μm, layer of aluminum. The thicknesses of layer 136 and the dielectric layer sandwiched between the two metallic layers help determine absorption.

Optional outer dielectric layer 138 may comprise at least one, at least 5, or at least ten distinct layers of dielectric material. Like inner dielectric layer 134, dielectric layers 138 are constructed of any suitable dielectric material, including but not limited to silicon dioxide, titanium dioxide, and the like. The presence of dielectric layer(s) 138 on the thin metal layer helps in achieving the desired reflectance spectrum.

Interference layer 130 is constructed so as to absorb one or more desired, predetermined wavelengths. This may be accomplished by adjusting the thickness of layers 134, 136 and 138. The predetermined wavelength may be selected as the wavelength that is used to write machine-readable features on the optical medium so that a single light source can be used to make both the machine-readable features and the human-readable features. For example, compact disc (CD) drives typically use lasers in the 770–790 nm range, typically 780 nm, while digital versatile disc (DVD) drives typically use lasers in the 630–660 nm range, typically 650 nm. Interference layer can be tuned to absorb in either of these ranges or other desired ranges.

By way of example, three embodiments of imaging medium 100 are described in Tables I, II and III below. Table I lists an exemplary construction of an interference layer designed to absorb light having a wavelength of 650 nm; Table II lists an exemplar construction of an interference layer designed to absorb light having a wavelength of 780 nm; and Table III lists an exemplary construction of an interference layer designed to absorb light at both 650 nm and 780 nm.

In the examples described below, the properties of the materials forming the various layers were assumed to be as follows:

| Material | Refractive Index | Extinction Coefficient |
|---|---|---|
| Dye | 2.3 | 0.1 |
| TiO$_2$ | 2.3486 | 0.00037 |
| SiO$_2$ | 1.4618 | 0 |
| Al | 0.7 | 5.66333 |

TABLE I

| Layer Medium | Material | Geometric Thickness (μm) |
|---|---|---|
| | Dye0 | 10 |
| 1 | TiO2 | 0.147098 |
| 2 | SiO2 | 0.126657 |
| 3 | TiO2 | 0.085679 |
| 4 | SiO2 | 0.086504 |
| 5 | TiO2 | 0.10223 |
| 6 | SiO2 | 0.188334 |
| 7 | TiO2 | 0.115684 |
| 8 | SiO2 | 0.194695 |
| 9 | TiO2 | 0.212715 |
| 10 | SiO2 | 0.559163 |
| 11 | TiO2 | 0.121685 |

TABLE I-continued

| Layer Medium | Material | Geometric Thickness (μm) |
|---|---|---|
| 12 | Al | 0.02987 |
| 13 | SiO2 | 0.230723 |
| Metal Substrate | Al | ≧1 |
| Total Thickness | | 2.201040 |

TABLE II

| Layer Medium | Material | Geometric Thickness (μm) |
|---|---|---|
| | Dye_M | 10 |
| 1 | TiO2 | 0.243843 |
| 2 | SiO2 | 0.161139 |
| 3 | TiO2 | 0.053141 |
| 4 | SiO2 | 0.000275 |
| 5 | TiO2 | 0.120827 |
| 6 | SiO2 | 0.179092 |
| 7 | TiO2 | 0.113509 |
| 8 | SiO2 | 0.202301 |
| 9 | TiO2 | 0.19954 |
| 10 | SiO2 | 0.250025 |
| 11 | TiO2 | 0.161917 |
| 12 | Al | 0.037947 |
| 13 | SiO2 | 0.335425 |
| Metal Substrate | Al | ≧1 |
| Total Thickness | | 2.058985 |

TABLE III

| Layer Medium | Material | Geometric Thickness μm |
|---|---|---|
| | Dye_M | 10 |
| 1 | TiO2 | 0.030274 |
| 2 | SiO2 | 0.155839 |
| 3 | TiO2 | 0.112705 |
| 4 | SiO2 | 0.179066 |
| 5 | TiO2 | 0.047814 |
| 6 | SiO2 | 0.186132 |
| 7 | TiO2 | 0.138861 |
| 8 | SiO2 | 0.183138 |
| 9 | TiO2 | 0.024039 |
| 10 | SiO2 | 0.009766 |
| 11 | TiO2 | 0.149906 |
| 12 | SiO2 | 0.183654 |
| 13 | TiO2 | 0.144358 |
| 14 | SiO2 | 0.091646 |
| 15 | TiO2 | 0.453797 |
| 16 | SiO2 | 0.616275 |
| 17 | TiO2 | 0.140621 |
| 18 | Al | 0.124877 |
| 19 | SiO2 | 0.21534 |
| Metal Substrate | Al | ≧1 |
| Total Thickness | | 3.188109 |

Figure 2:
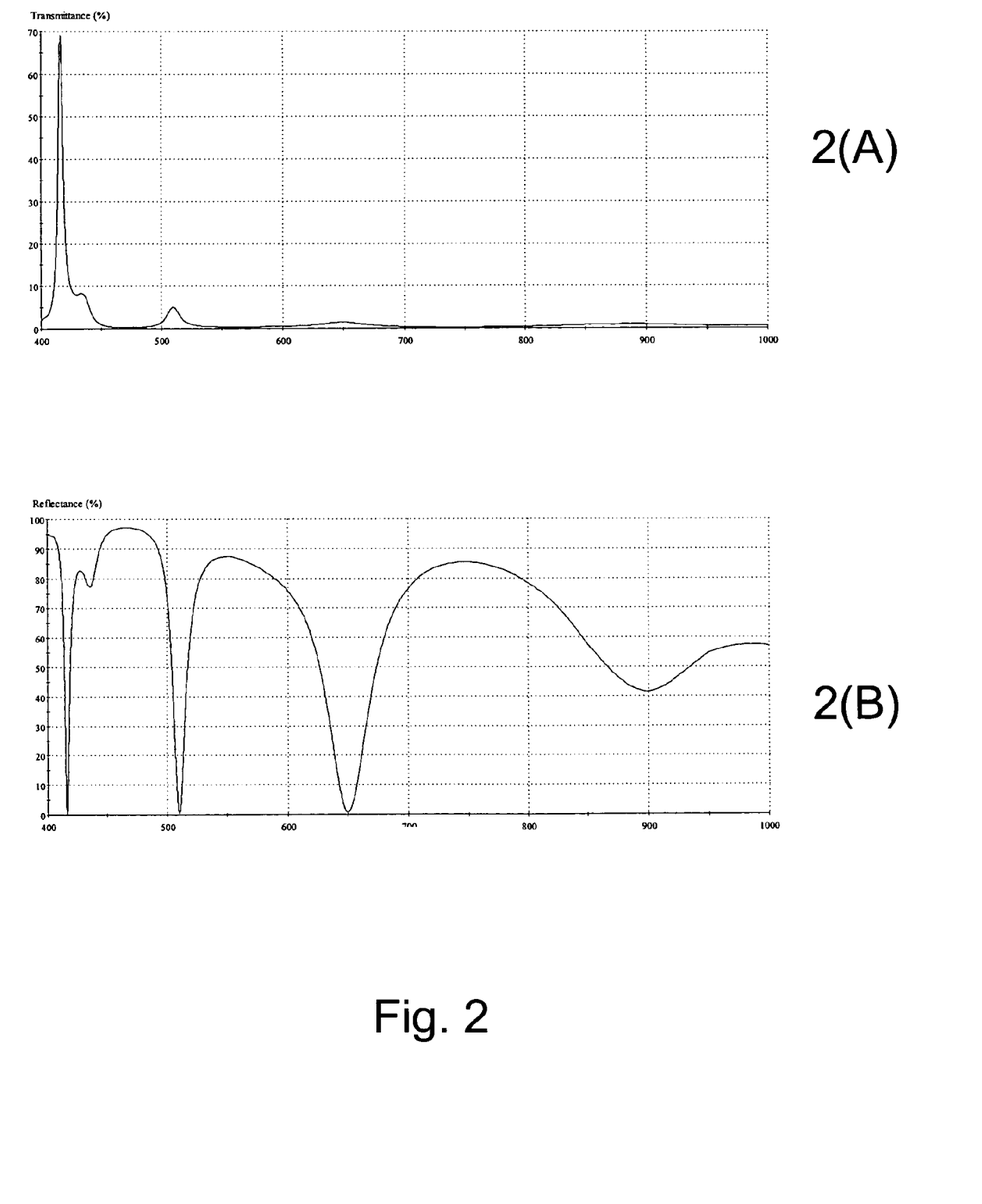
FIG. 2 is a pair of plots in which the (A) plot shows transmittance and the (B) plot shows reflectance for an imaging medium constructed in accordance with a first exemplary embodiment of the invention.
Figure 3:
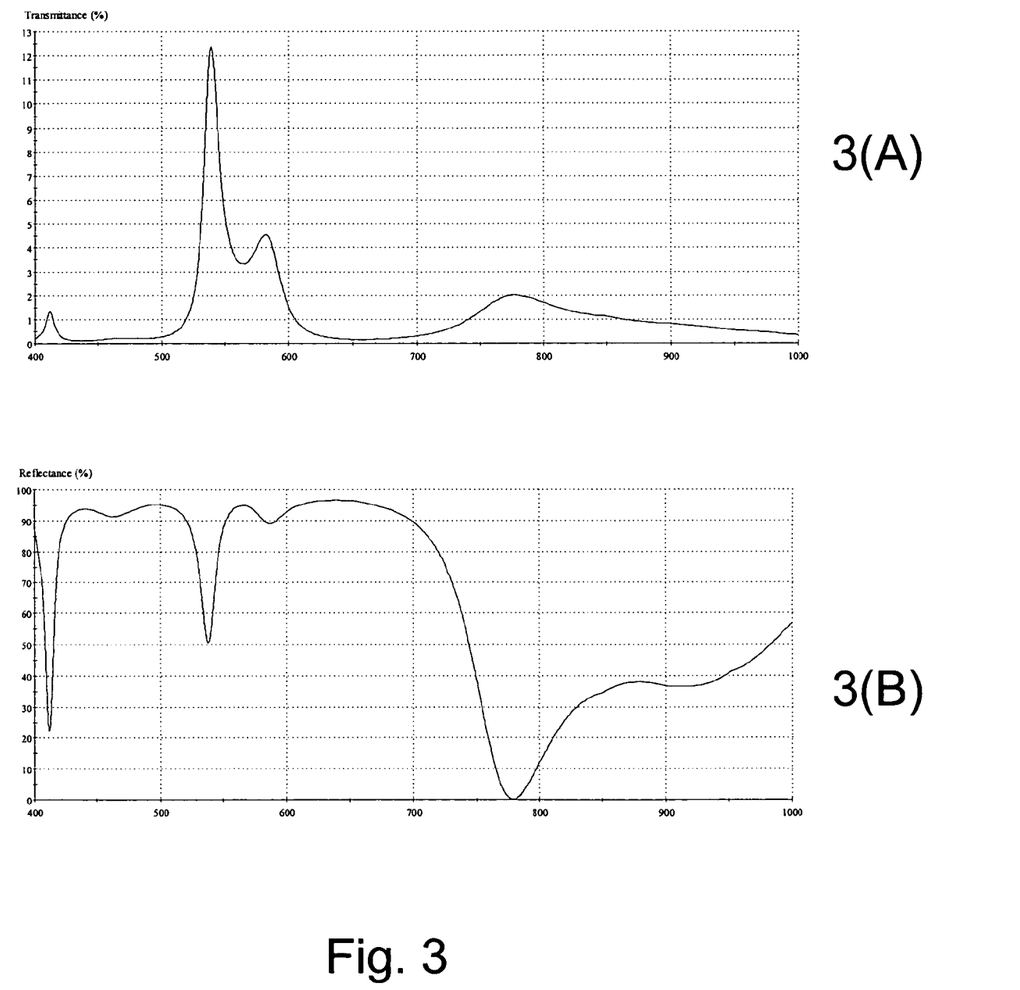
FIG. 3 is a pair of plots in which the (A) plot shows transmittance and the (B) plot shows reflectance for an imaging medium constructed in accordance with a second exemplary embodiment of the invention.
Figure 4:
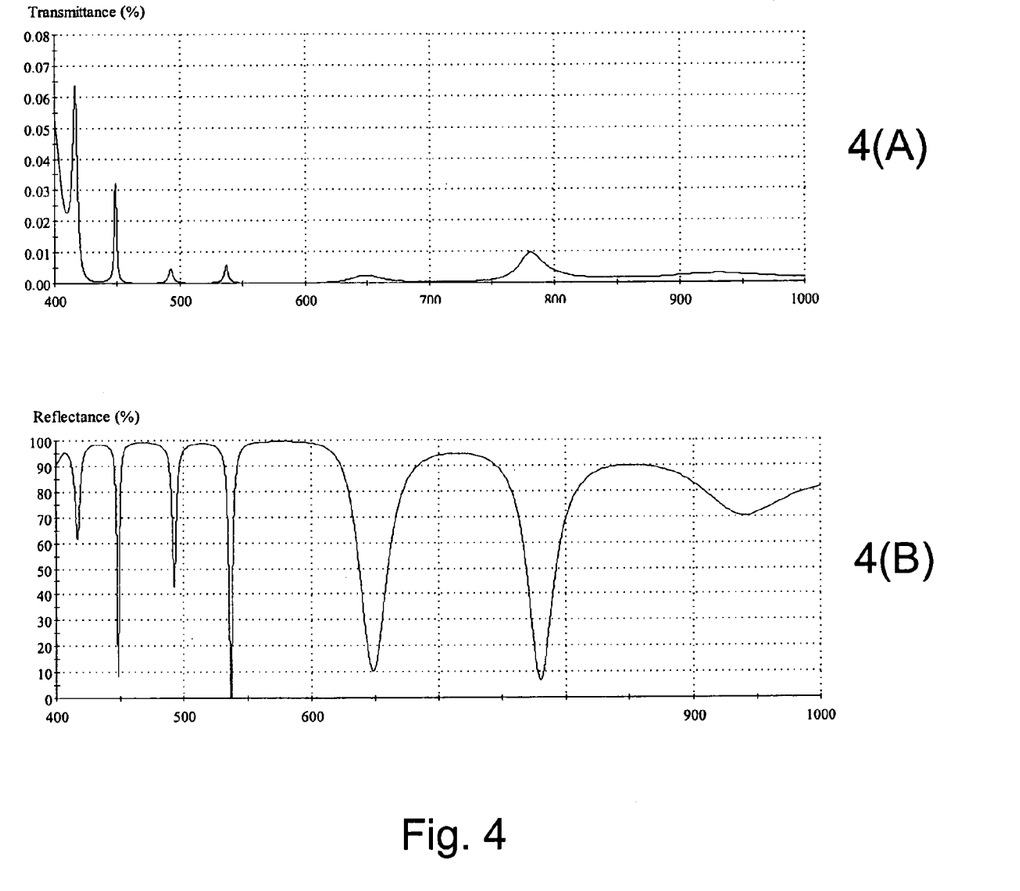
FIG. 4 is a pair of plots in which the (A) plot shows transmittance and the (B) plot shows reflectance for an imaging medium constructed in accordance with a third exemplary embodiment of the invention.

Imaging layers constructed in accordance with the exemplary embodiments set out in Tables II and III were tested for transmittance and reflectance. The results are plotted in FIGS. 2, 3, and 4, which correspond to the embodiments of Tables I, II, and III, respectively. In each case, the (A) plot shows transmittance and the (B) plot shows reflectance. The fact that the transmission and reflectance curves do not add up to 100% shows that the unaccounted light is absorbed. In each case, light at the targeted wavelength is substantially absorbed, while most of the light in the visible portion of the spectrum (450 nm and 780 nm) is reflected. In accordance with the objects of the invention, the absorbed light is converted into heat.

In order to allow marking layer 140 to generate a human-visible mark in response to the stimulus (heat), it includes a thermochromic compound. For example, marking layer 140 may comprise an aggregate including a matrix material 150 having thermochromic particles 160 suspended therein as shown. The thermochromic compound may include at least one component that is present as particles 160 and may include another component that may is dissolved in matrix material 150. In alternative embodiments, marking layer 140 is free of particles and comprises a layer of a thermochromic material that includes a dispersed thermochromic compound.

The matrix material may be any composition suitable for dissolving and/or dispersing the thermochromic compound. Acceptable materials may include, by way of example only, UV curable matrices such as acrylate derivatives, oligomers and monomers, with a photo package. A photo package may include a light absorbing species that initiates reactions for curing of a matrix, such as, by way of example, benzophenone derivatives. Other examples of photoinitiators for free radical polymerization monomers and pre-polymers include but are not limited to: thioxanethone derivatives, anthraquinone derivatives, acetophenones and benzoine ether types. It may be desirable to choose a matrix that can be cured by a form of radiation other than the type of radiation that causes a color change.

Matrix materials suitable for use in marking layer 140 may be based on cationic polymerization resins and may require photo-initiators such as those based on aromatic diazonium salts, aromatic halonium salts, aromatic sulfonium salts and metallocene compounds. An example of an acceptable matrix or matrix may include Nor-Cote CLCDG-1250A or Nor-Cote CDG000 (mixtures of UV curable acrylate monomers and oligomers), which contains a photoinitiator (hydroxy ketone) and organic solvent acrylates (e.g., methyl methacrylate, hexyl methacrylate, beta-phenoxy ethyl acrylate, and hexamethylene acrylate). Other acceptable materials may include acrylated polyester oligomers such as CN292, CN293, CN294, SR351 (trimethylolpropane tri acrylate), SR395 (isodecyl acrylate), and SR256 (2(2-ethoxyethoxy) ethyl acrylate) available from Sartomer Co.

A thermochromic color-forming agent may be present in marking layer 140 and may comprise a single-component heat-responsive dye or a leuco dye in combination with an activator. For example, the color-forming agent may be an irreversible thermochromic material such as an ink or dye. In other embodiments, the thermochromic compound may comprise a leuco dye and activator, either of which may be provided as particles 160 or dissolved in matrix material 150. The activator and leuco dye, when mixed, produce a change in color that is discernable to the human eye. Either of the activator and the leuco dye may be soluble in the matrix. The other component (activator or leuco dye), or the single-component heat-responsive dye, may be substantially insoluble in the matrix and may be suspended in the matrix as uniformly distributed particles 160.

If a single-component heat-responsive dye is used, a human-readable mark can be produced by raising the temperature of the marking layer in the region where it is desired to form a mark sufficiently to cause the dye to change color; if a leuco dye is used in combination with an activator, a human-readable mark can be produced by raising the temperature of the marking layer in the region where it is desired to form a mark sufficiently to melt the matrix and provide a localized liquid phase in which the leuco dye and activator can react.

Because good heat transfer from interference layer 130 to marking layer 140 is desired, a heat transfer layer (not shown) may be applied at the interface between interference layer 130 and marking layer 140. Alternatively, marking layer 140 may be applied directly to interference layer 130.

It will be understood that the relative positions of interference layer 130 and marking layer 140 may be reversed, so long as interference layer is sufficiently transparent to the visible wavelengths to allow the human-readable features to be read through it.

As illustrated schematically, in operation, energy 110 may be directed imagewise onto imaging medium 100. The form of energy may vary depending upon the equipment available, ambient conditions, and desired result. Examples of energy that may be used include IR radiation, UV radiation, x-rays, or visible light. In some embodiments the light source is a laser.

Any laser or light source such as an LED can be used to provide energy to the color forming compositions; currently there are many such light sources are known. Those of particular interest include commercially available devices that can be incorporated into an optical disk reading and/or writing device, particularly those in the 200 nm to 1200 nm wavelength range. However, wavelengths outside of this range can also be used in alternative embodiments of the present invention. Exemplary laser types that can be used include krypton-fluoride excimer (249 nm), xenon-chloride eximer (308 nm), nitrogen gas (337 nm), organic dye in solution (300 nm to 1000 nm-tunable), krypton ion (335 nm to 800 nm), argon ion (450 nm to 530 nm), helium neon (543 nm, 632.8 nm, and 1150 nm), semiconductor GaInP family (670 nm to 680 nm), ruby (694 nm), semiconductor GaAlAs family (750 nm to 900 nm), neodymium YAG (1064 nm), semiconductor InGaAsP family (1300 nm to 1600 nm), hydrogen-fluoride chemical (2600 nm to 3000 nm), etc. In addition to the above, these and other commercially available lasers are available having wavelengths of: 375 nm, 405 nm, 408 nm, 440 nm, 635 nm, 638 nm, 650 nm, 660 nm, 670 nm, 685 nm, 780 nm, 785 nm, 810 nm, 830 nm, 850 nm, 980 nm, 1084 nm, 1310 nm, and 1550 nm, for example. These laser-types and others are useable in accordance with embodiments of the present invention, provided the light source is capable of providing sufficient energy to cause the desired color change.

Light incident on interference layer 130 passes completely or at least partially through thin metal layer 136. Dielectric layer(s) 138, if present, tend to reflect light having wavelengths other than the desired wavelength. Depending on the thickness of dielectric layer 134 and angle of the incident light, certain wavelengths will be absorbed within interference layer 130, while other wavelengths will be transmitted through interference layer 130. Portions of the incident light that are not subject to destructive interference are reflected by metal substrate layer 132 and may be subject to further destructive interference as they return through dielectric layer 134.

The energy of the light that is not transmitted is transformed into heat. Because the light is applied in a very localized fashion, the resulting heat is also localized. If sufficient light energy is applied to an area, the temperature of that area will rise enough to trigger a color change in the portion of marking layer 140, as shown at 152 (beginning)

and 153 (completed). If the color-forming agent is a leuco dye and the change in temperature is sufficient to cause suspended particles 140 to melt, the activator and dye will react to form a color.

In certain embodiments, the machine-readable layers are applied to one surface of the optical recording medium and the present imaging compositions are applied to the opposite surface of the optical recording medium. In these embodiments, the user can remove the disc or medium from the write drive after the first writing process, turn it over, and re-insert it in the write drive for the second writing process, or the write drive can be provided with two write heads, which address opposite sides of the medium. Alternatively, separate portions of one side of the optical recording medium can be designated for each of the machine- and human-readable images.

Thus, the present invention is applicable in systems comprising a processor, a laser coupled to the processor, and a data storage medium including a substrate having a first surface that can be marked with machine-readable marks by said laser and a second surface that can be marked with human-readable marks by said laser. The second surface includes an imaging composition in accordance with the invention, comprising a marking layer and an interference layer that absorbs light energy and converts it to thermal energy sufficient to heat the light layer.

The above discussion is meant to be illustrative of the principles and various embodiments of the present invention. Numerous variations and modifications will become apparent to those skilled in the art once the above disclosure is fully appreciated. For example, additional components, such as an addition absorber, flow or melt additives, or additional color-formers, may be added. It is intended that the following claims be interpreted to embrace all such variations and modifications.

What is claimed is:

1. An optical recording medium, comprising:
    a substrate, and
    an imaging medium disposed on said substrate, said imaging medium comprising:
        a marking layer including a thermochromic compound; and
        an interference layer tuned to absorb light having a predetermined wavelength;
        wherein said interference layer comprises at least two metal layers and at least one dielectric layer therebetween.

2. The optical recording medium of claim 1 wherein said themochromic compound comprises a leuco dye and an activator.

3. The optical recording medium of claim 1 further including on said substrate means for recording machine-readable marks using light at said predetermined wavelength.

4. The optical recording medium of claim 1 wherein said interference layer absorbs light having a wavelength between 770 and 790 nm.

5. The optical recording medium of claim 1 wherein said interference layer absorbs light having a wavelength between 630 and 680 nm.

6. The optical recording medium of claim 1, wherein said interference layer is adjacent to said substrate.

7. The optical recording medium of claim 1, wherein said marking layer is adjacent to said substrate.

8. The optical recording medium of claim 1, wherein said interference layer comprises a first metal layer disposed on said substrate, a first dielectric layer disposed on said first metal layer, a second metal layer disposed on said first dielectric layer, and a dye layer.

9. The optical recording medium of claim 8, further including a second dielectric layer disposed between said second metal layer and said dye layer.

10. The optical recording medium of claim 1 wherein said substrate is glass.

11. The optical recording medium of claim 1 wherein said substrate is plastic.

12. The optical recording of claim 1 wherein said substrate is paper.

13. A means for providing human-readable and machine-readable marks on an optical recording medium, comprising:
    first means for recording machine-readable marks on said medium in response to an optical signal having a wavelength;
    second means for recording human-readable marks on said medium, said second means including thermochromic means for producing a human-detectable optical change in response to a thermal stimulus and an interference layer for converting an optical signal having said wavelength into heat, wherein said interference layer comprises at least a spacer between first and second reflecting layers.

14. The marking means of claim 13 wherein said thermochromic compound comprises a leuco dye and an activator.

15. The marking means of claim 13 wherein said interference layer absorbs light having a wavelength between 770 and 790 nm.

16. The marking means of claim 13 wherein said interference layer absorbs light having a wavelength between 630 and 680 nm.

17. A system, comprising:
    a processor,
    a laser coupled to said processor;
    a data storage medium including a substrate having a first surface that can be marked with machine-readable marks by said laser and a second surface that can be marked with human-readable marks by said laser, said second surface including an imaging medium comprising:
        a marking layer including a thermochromic compound; and
        an interference layer tuned to absorb light having a predetermined wavelength, wherein said interference layer comprises at least a spacer between first and second reflecting layers.

18. The system of claim 17 wherein said thermochromic compound comprises a leuco dye and an activator.

19. The system of claim 17 wherein said interference layer absorbs light having a wavelength between 770 and 790 nm.

20. The system of claim 17 wherein said interference layer absorbs light having a wavelength between 630 and 680 nm.

* * * * *

UNITED STATES PATENT AND TRADEMARK OFFICE
CERTIFICATE OF CORRECTION

| | | |
|---|---|---|
| PATENT NO. | : 7,198,834 B2 | Page 1 of 1 |
| APPLICATION NO. | : 11/086875 | |
| DATED | : April 3, 2007 | |
| INVENTOR(S) | : Makarand P. Gore et al. | |

It is certified that error appears in the above-identified patent and that said Letters Patent is hereby corrected as shown below:

In column 5, line 3, delete "and" and insert -- to --, therefor.

In column 7, line 49, in Claim 2, delete "themochromic" and insert -- thermochromic --, therefor.

Signed and Sealed this

Twenty-third Day of June, 2009

JOHN DOLL
*Acting Director of the United States Patent and Trademark Office*